(12) United States Patent
Chestnut, Jr.

(10) Patent No.: US 9,257,820 B2
(45) Date of Patent: Feb. 9, 2016

(54) WIRE AND TUBE PULLING TOOL

(71) Applicant: Jimmie A. Chestnut, Jr., Lakeland, FL (US)

(72) Inventor: Jimmie A. Chestnut, Jr., Lakeland, FL (US)

(*) Notice: Subject to any disclaimer, the term of this patent is extended or adjusted under 35 U.S.C. 154(b) by 394 days.

(21) Appl. No.: 13/644,028

(22) Filed: Oct. 3, 2012

(65) Prior Publication Data

US 2013/0200315 A1 Aug. 8, 2013

Related U.S. Application Data

(60) Provisional application No. 61/596,135, filed on Feb. 7, 2012.

(51) Int. Cl.
*H02G 1/08* (2006.01)

(52) U.S. Cl.
CPC ........................................ *H02G 1/085* (2013.01)

(58) Field of Classification Search
USPC ............. 254/30, 120, 129, 131, 132; 114/218
See application file for complete search history.

(56) References Cited

U.S. PATENT DOCUMENTS

| | | | |
|---|---|---|---|
| 68,572 A | 9/1867 | Porter | |
| 294,660 A | 3/1884 | Mottram et al. | |
| 402,161 A | 4/1889 | Holmes | |
| 524,701 A | 8/1894 | Bowen | |
| 590,760 A | 9/1897 | Heath | |
| 650,186 A * | 5/1900 | Maxson | 254/28 |
| 1,031,185 A | 7/1912 | Krulish | |
| 1,107,919 A | 8/1914 | Douglass | |
| 1,164,155 A | 12/1915 | Woodson | |
| 1,309,734 A | 7/1919 | Hemfling | |
| 1,562,034 A | 11/1925 | Mieher | |
| 1,663,182 A * | 3/1928 | Semmler | 242/388.4 |
| 1,892,824 A | 1/1931 | Ziegler et al. | |
| 2,150,646 A | 3/1939 | Colt | |
| 2,261,413 A * | 11/1941 | Robertson | 254/253 |
| 2,338,747 A * | 1/1944 | Waldheim | 211/119.09 |
| 2,374,530 A | 4/1945 | Fiebke | |
| 2,394,313 A | 2/1946 | Krummel | |
| 2,569,242 A | 5/1947 | Kors | |
| 2,520,427 A | 8/1950 | Nelson | |
| 2,629,584 A | 2/1953 | Cannon | |
| 2,769,236 A | 11/1956 | Phillips et al. | |
| 3,113,758 A | 12/1963 | Knowles | |
| 3,181,234 A * | 5/1965 | Gill | 29/237 |
| 3,549,128 A | 12/1970 | Homiak | |
| 3,711,901 A * | 1/1973 | Close | 242/388.4 |
| 3,836,119 A | 9/1974 | Saucier | |
| 3,891,188 A | 6/1975 | Pierce | |
| 4,009,743 A | 3/1977 | Ackerman | |

(Continued)

*Primary Examiner* — Joseph J Hail
*Assistant Examiner* — Jon Taylor
(74) *Attorney, Agent, or Firm* — Patrick D. Herron, Esq.; Terry M. Sanks, Esq.; Beusse Wolter Sanks & Maire, PLLC

(57) ABSTRACT

A hand tool (10), including: a handle (14) at a handle end (16) of an elongated main body (12); an arcuate shaped contact surface (20) on a base end (22) of the elongated main body opposite the handle end; a support strut (35) extending laterally from the elongated main body; and a connection structure (26) disposed at a distal end of the support strut, between the handle end and the arcuate shaped contact surface. The handle is positioned on a concave side (18) of the arcuate shaped contact surface along a line (50) perpendicular to a tangent (52) of the arcuate shaped contact surface, and the perpendicular line traverses a middle 80% of the arcuate shaped contact surface.

19 Claims, 7 Drawing Sheets

(56) References Cited

U.S. PATENT DOCUMENTS

| | | | |
|---|---|---|---|
| 4,033,551 A | 7/1977 | Lindstrom | |
| 4,191,360 A | 3/1980 | Morrison | |
| 4,236,281 A * | 12/1980 | Bottum | 24/115 R |
| 4,745,651 A | 5/1988 | Schellenger | |
| 4,801,127 A * | 1/1989 | Patterson, Jr. | 254/134.3 FT |
| 4,856,759 A * | 8/1989 | Ness | 254/132 |
| 4,896,897 A * | 1/1990 | Wilhelm | 280/655 |
| 5,159,859 A | 11/1992 | Whitesell | |
| 5,176,363 A | 1/1993 | Bowlin | |
| 5,447,289 A | 9/1995 | Callahan | |
| 5,732,933 A | 3/1998 | Champi | |
| 5,979,956 A | 11/1999 | Pegram | |
| D436,823 S | 1/2001 | Wrensch | |
| D439,126 S | 3/2001 | Gohman | |
| 6,296,230 B1 | 10/2001 | Roth | |
| 6,446,483 B1 * | 9/2002 | Ericksen | 72/459 |
| 6,499,778 B2 | 12/2002 | Boulay | |
| 6,508,456 B2 | 1/2003 | Hulburd et al. | |
| 6,929,251 B2 | 8/2005 | Watson | |
| 6,978,983 B1 * | 12/2005 | Sclease et al. | 254/30 |
| 7,618,020 B2 | 11/2009 | Del Favero | |
| 7,655,109 B2 * | 2/2010 | Manners | 156/714 |
| 2005/0211962 A1 | 9/2005 | Atkinson | |
| 2006/0006370 A1 | 1/2006 | Khristo | |
| 2008/0164446 A1 * | 7/2008 | Baldwin | 254/30 |
| 2008/0210916 A1 * | 9/2008 | Berkbuegler | 254/131 |
| 2008/0251773 A1 | 10/2008 | Smeeton et al. | |
| 2009/0121203 A1 * | 5/2009 | Martini et al. | 254/131 |
| 2010/0044657 A1 * | 2/2010 | Patrick et al. | 254/130 |
| 2010/0065798 A1 | 3/2010 | Spells | |
| 2011/0016688 A1 | 1/2011 | Townsend | |

* cited by examiner

WIRE AND TUBE PULLING TOOL

This application claims the benefit of the 7 Feb. 2012 filing date of U.S. Provisional Application No. 61/596,135 which is incorporated by reference herein.

FIELD OF THE INVENTION

The present invention relates to a versatile hand tool for moving flexible wires and tubes through elongated conduits.

BACKGROUND OF THE INVENTION

Wires, tubes, and other various long and at least somewhat flexible items are often disposed within protective conduits to prevent damage to them and/or to prevent harm to others via inadvertent contact with the items. However, the wires and tubes possess an inherent rigidity which, together with friction, usually impedes the process of drawing them through the conduit. In such cases a lead, such as a more flexible rope or a ribbon tape etc., may first be fed through the conduit to the waiting wires and/or tubes. The lead is then fastened to a leading end of the wires/tubes and the lead is pulled back to its entry point. Oftentimes the resistance of the threading operation exceeds an amount of force a person would be able to exert to complete the threading operation manually. As a result various tools have been developed to aid the person in the threading process. However, many of these tools, for example, wenches, are complex, heavy, in some cases expensive, and require a minimum amount of operating space. In addition, in many cases a winch may be more suited for heavy duty pulling when only a relatively moderate amount of pulling force is actually needed. It is common for heavy duty pullers to operate at a relatively slow speed to effect the high forces needed, and in the construction industry speed is often a paramount consideration. Consequently there remains room in the art for improvement.

BRIEF DESCRIPTION OF THE DRAWINGS

The invention is explained in the following description in view of the drawings that show.

DETAILED DESCRIPTION OF THE INVENTION

Figure 1:
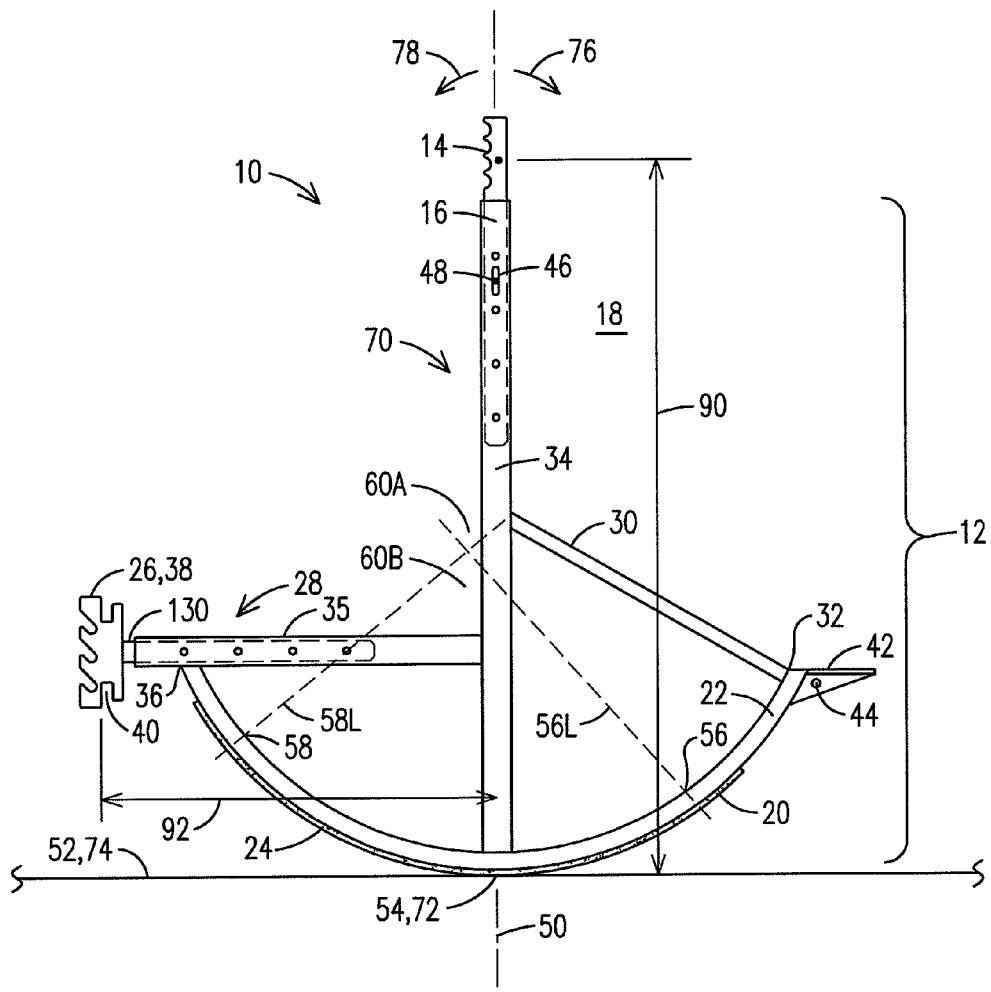
FIG. 1 is a side view of an exemplary embodiment of a hand tool.

The present inventor has devised an innovative and versatile, yet simple hand tool that can be used to pull wires or tubes or the like through a conduit, etc. The hand tool allows an operator to employ a simple back and forth motion, coupled with leverage made possible through the design, to draw the wires/tubes through the conduit. Drawing the wires/tubes can be done by moving the hand tool in a first/rearward direction or in a second/forward direction. The direction may be chosen to best suit a location of an outlet of the conduit, a direction the wires/tubes are to be drawn, and/or an amount of available space for the drawing operation.

FIG. 1 shows a side view of an exemplary embodiment of the hand tool 10, including an elongate main body 12, a handle 14 at a handle end 16 of the elongated main body 12 and on a concave side 18 of an arcuate contact surface 20, an arcuate base end 22 of the elongated main body 12 that defines the arcuate contact surface 20, an optional non slip cover 24, a connection structure 26, and a connection structure adjustment mechanism 28. Also visible are an optional support strut 30 spanning from at or about a first end 32 of the arcuate base end 22 to a main body shaft 34, and an optional connection structure support strut 35, which may form part of the connection structure adjustment mechanism 28, and may span from at or about a second end 36 of the arcuate base end 22 to the main body shaft 34. In the exemplary embodiment shown, the connection structure 26 disposed at a distal end of the puller body 35 and is shown as puller head 38. The connection structure 26 may include a connection structure cleat, and when the connection structure 26 is a puller head 38 it may incorporate a puller head cleat 40. However, the connection structure 26 may take on other shapes, ranging from the puller head cleat 40 to a simple hole or other attachment point. The hand tool 10 may further include a foot pedal 42 that may extend horizontally when the hand tool 10 is oriented as shown, a clevis hole 44, a handle adjustment mechanism 46, and a main body cleat 48.

In the exemplary embodiment of FIG. 1 the elongated main body 12 primarily includes the main body shaft 34 and the arcuate bade end 22. As depicted, the main body shaft 34 and the handle 14 sit on a handle line 50 that is perpendicular to a tangent 52 of the arcuate contact surface 20. In this exemplary embodiment the tangent 52 is taken at a tangent point 54 that is approximately half way between the first end 32 of the arcuate base end 22 and the second end 36 of the arcuate base end 22. The tangent point 54 may be located at any location in a tangent range bounded by a tangent range first end 56 and a tangent range second end 58. Thus, the handle may be disposed anywhere along line 56L, along line 58L, or within fields 60A, 60B bounded by lines 56L and 58L. It is envisioned that practical limitations will generally result in the handle 14 being disposed within field 60A. The tangent range has an arc length that represents approximately the middle 80% of an arc length of the arcuate contact surface 20, such that the handle line 50 traverses the arcuate shaped contact surface 20 within the middle 80% of the arc length. If the handle 14 were to be placed outside of the tangent range it would likely be disposed too close to the first end 32 of the arcuate base end 22 or the second end 36 of the arcuate base end 22 to permit an acceptable amount of back and forth motion necessary to enable use of the hand tool 10 in both directions. It would also likely limit the proper balance of force and travel necessary, as will be made evident through subsequent figures. In an exemplary embodiment the tangent range may be disposed in a middle third of the arc length of the arcuate contact surface 20.

Although the FIG. 1 exemplary embodiment shows a simple, straight main body shaft 34 and a simple, arcuate base end 22, various other configurations may be used to accomplish the functions of the hand tool 10. For example, on the concave side 18, the arcuate base end 22 may or may not follow the contour of the arcuate contact surface 20. A more substantial arcuate base end 22 may be used, such that the arcuate base end may resemble half a circle etc. Further, the arcuate contact surface 20 may or may not be a minor arc of a circle, and may be continuous or discontinuous. Other curved profiles may be used as necessary. The main body shaft may likewise not be a simple, straight shaft, but may take on any shape necessary. So long as the handle 14 is appropriately placed, and so long as the hand tool may move back and forth as described below, the particulars of the configuration on the concave side 18 of the hand tool 10 are less important.

As shown in FIG. 1 the hand tool 10 is in a hand tool neutral position 70, where the handle 14 is disposed directly over a pivot point 72, which is a point of contact between the arcuate contact surface 20 and a horizontal, flat surface 74. When in the hand tool neutral position 70, the horizontal, flat surface 74 and the tangent 52 are in the same plane, and the handle line 50 is perpendicular to the plane. The connection structure adjustment mechanism 28 allows the puller head 38 to be moved laterally toward and from the elongated main body 12, thereby defining an adjustably positionable relationship between the two. In an exemplary embodiment, when in the hand tool neutral position 70 the connection structure adjustment mechanism 28 is configured to allow the puller head 38 to move parallel to the horizontal, flat surface 74.

Force may typically be applied by a user at the handle 14 and/or the foot pedal 42 and/or the clevis hole 44, resulting in movement in either a first direction 76 or a second direction 78. When movement of the handle 14 is effected it results in movement of the puller head 38 in the same plane and in the same direction, which, in turn effects a drawing of the wires/tubes. The handle 14 is disposed at a certain vertical distance 90 from the pivot point 72. The puller head 38 is disposed at a certain horizontal distance 92 from the pivot point 72. Consequently, a force input at the handle 14 results in a force output at the puller head 38 that is adjusted by a ratio of the vertical distance 90 to the horizontal distance 92. In many configurations it is expected that there will be a force multiplying effect from the force input at the handle 14 to the force output at the puller head 38. A force multiplication necessarily results in a reduced travel distance, where the travel distance of the handle 14 is reduced by the inverse ratio, which is the ratio of the horizontal distance 92 to the vertical distance 90. By adjusting a lateral position of the puller head 38 the force and distance ratios can be adjusted to suit the conditions of use. Likewise, the handle adjustment mechanism 46 permits vertical adjustment of the handle 14, and so the position of the handle 14 can be adjusted to produce the desired ratios.

The puller head 38 is disposed vertically above the pivot point 72 at least 10% of the vertical distance 90 in order to give meaning to any movement in the second direction 78. Below 10% and the physical size and shape of the puller head 38 would likely render any movement in the second direction 78 negligible.

Figure 2:
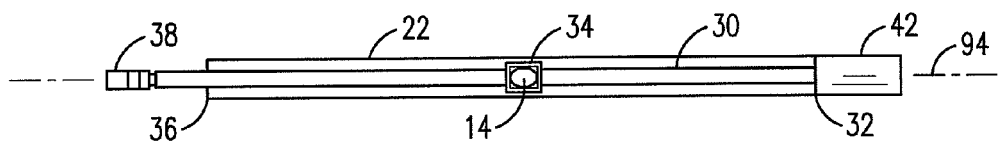
FIG. 2 is a top view of the hand tool of FIG. 1.

FIG. 2 shows a top view of the hand tool 10 of FIG. 1. Visible are the handle 14, the arcuate base end 22, the first end 32 of the arcuate base end 22 the second end 36 of the arcuate base end 22, and the puller head 38. Movement of the handle 14 and the puller head 38 are both effected within a plane of movement 94

Figure 3:
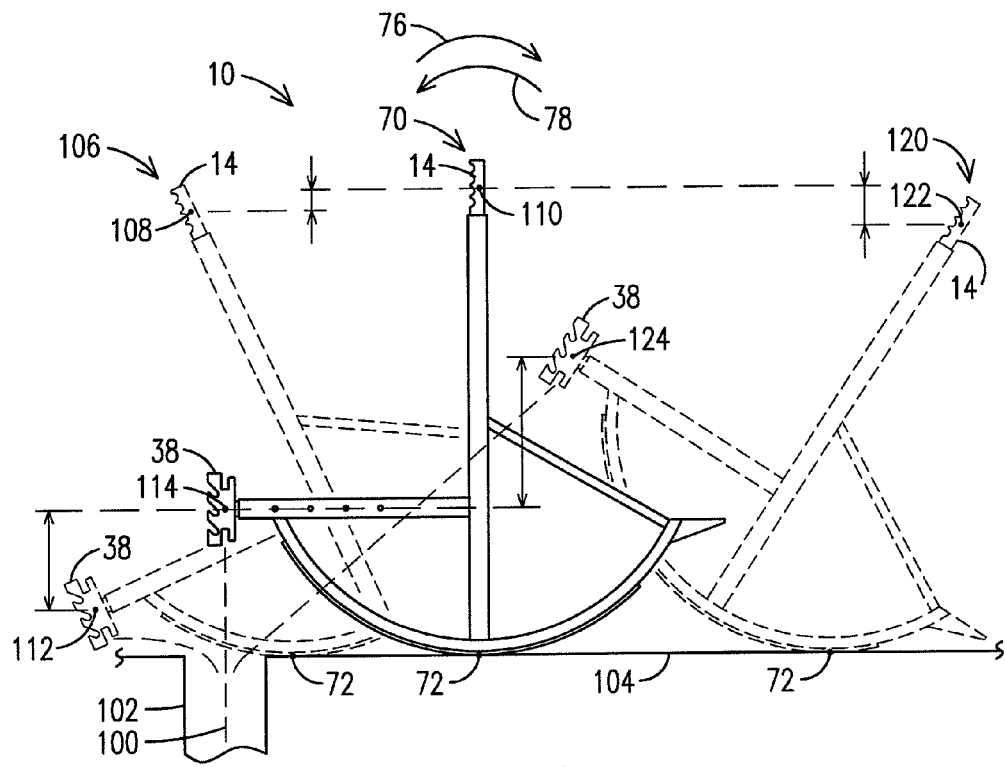
FIG. 3 is a side view of the hand tool of FIG. 1 in operation.

FIG. 3 shows the hand tool 10 in three positions indicative of how the hand tool 10 may be operated. When being used to pull wires/tubes 100 through a conduit 102 in, for example, a floor 104 that acts as the horizontal, flat surface 74, the hand tool 10 may be positioned in a hand tool second position 106 that is rotated to the second direction 78 of the hand tool neutral position 70, where the handle 14 is in a handle second position 108 that is vertically lower a handle neutral position 110 occupied by the handle 14 when the hand tool is in the hand tool neutral position 70. Likewise, when the hand tool 10 is in the hand tool second position 106 the puller head 38 is in a puller head second position 112 that is vertically lower than a puller head neutral position 114 occupied by the puller head 38 when the hand tool 10 is in the hand tool neutral position 70. In more general terms, when in the hand tool second position 106 the connection structure is in a connection structure second position that is vertically lower than a connection structure neutral position occupied by the connection structure when the hand tool 10 is in the hand tool neutral position 70. When in the hand tool second position 106 the wires/tubes 100 may be secured to the puller head 38.

The hand tool 10 may then be rotated in the first direction 76 through the hand tool neutral position 70, to a hand tool first position 120. In the hand tool first position 120 the handle 14 is in a handle first position 122, the handle 14 is in a handle first position 122 that is vertically lower a handle neutral position 110 occupied by the handle 14 when the hand tool is in the hand tool neutral position 70. However, when the hand tool 10 is in the hand tool first position 120 the puller head is in a puller head first position 124 that is vertically higher lower than a puller head neutral position 114 occupied by the puller head 38 when the hand tool 10 is in the hand tool neutral position 70. It can be seen that through this movement of the hand tool 10 the wires/tubes 100 have been drawn a distance through the conduit 102. Adjusting the position of the handle 14 via the handle adjustment mechanism 46, and adjusting the position of the puller head 38 via the connection structure adjustment mechanism 28, will change the ratios of force input to force output, and handle travel to puller head travel, and this can be adjusted to suit the circumstances of the pull. As the hand tool 10 is rotated it can be seen that the pivot point 72 moves along the arcuate contact surface 20.

Figure 4:
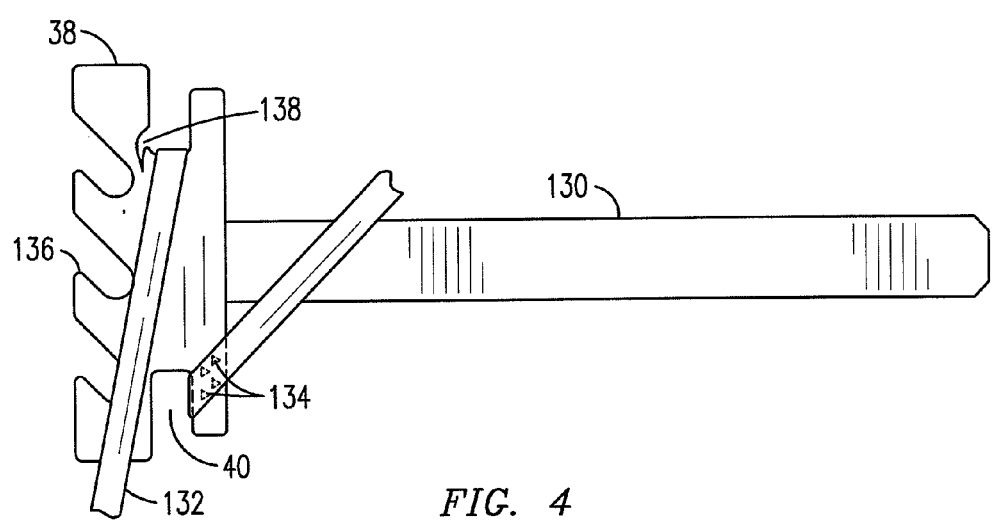
FIG. 4 is a side view of an exemplary embodiment of a connection structure.

FIG. 4 shows the puller head 38 and a puller head stem 130 which may adjustably fit into the connection mechanism support strut 35 and together the two may form the connection structure adjustment mechanism 28 that enables selective positioning of the connection structure 26, which is the puller head 38 in the exemplary embodiment shown. The puller head cleat 40 may receive a flexible lead from the wires/tubes that may be, for example, a flat and flexible tape 132. The tape 132 may be wrapped around the puller head cleat 40 and secured there. Alternately, it may extend toward the handle 14, where it may be held by the main body cleat 48 or remain in a hand of the user. Any known manner of securing the lead is acceptable. The puller head cleat 40 and/or the main body cleat 48 may have one or more features 134 to increase friction between the tape 132 and the respective cleat. For example, the puller head cleat 40 may have a knurled gripping surface, a non-slip surface such as rubber, or geometric features such as triangles that resist motion in one direction via increased frictional force, but resist much less in the other direction. In operation these features 134 may further grip the tape 132 and increase an amount of output force transferred from the puller head 38 to the tape 132, and ultimately, to the wires/tubes 100. If the tape 132 is being secured by the operator, the features 134 may reduce the amount of force needed to retain the tape 132 in position. The puller head 38 may also and/or alternately have hooks 136 that may receive a tape 132 having a loop shape. The features 134 may include a deep groove 138 configured such that the tape 132 is wedged therein during a draw operation.

Figure 5:
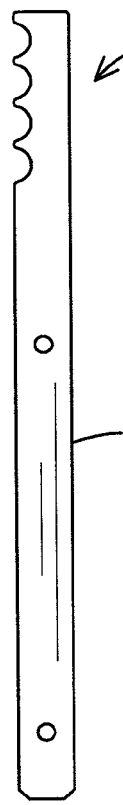
FIG. 5 is a side view of an exemplary embodiment of a handle.

FIG. 5 shows an exemplary embodiment of the handle 14 having a handle stem 140. Similar to the puller head stem 130, the handle stem 140 may cooperate with the main body shaft 34 or any other suitable component to form the handle adjustment mechanism 46 that allows the handle to be selectively positionable.

Figure 6:
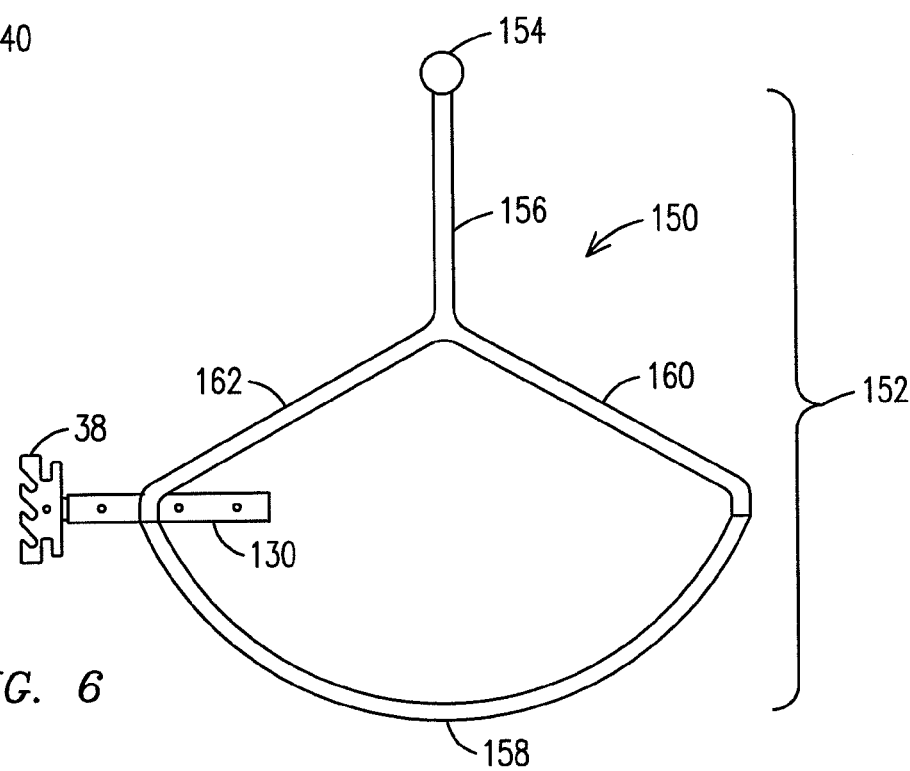
FIG. 6 is a side view of an alternate exemplary embodiment of the hand tool.
Figure 7:
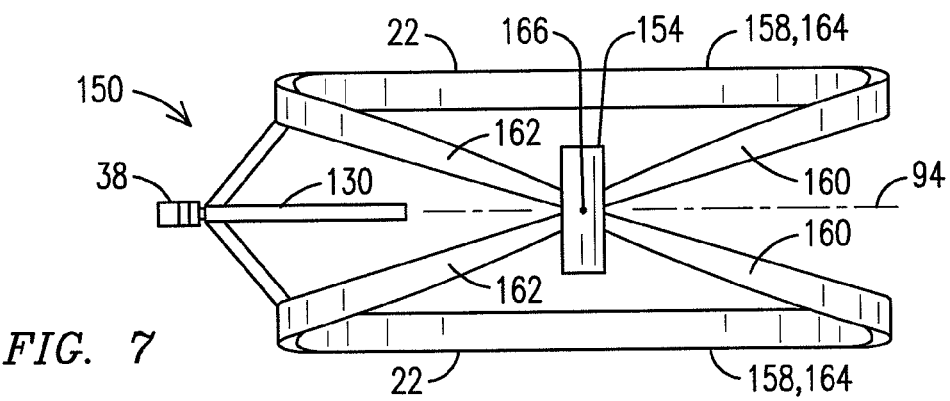
FIG. 7 is a top view of the alternate exemplary embodiment of the hand tool of FIG. 6.
Figure 8:
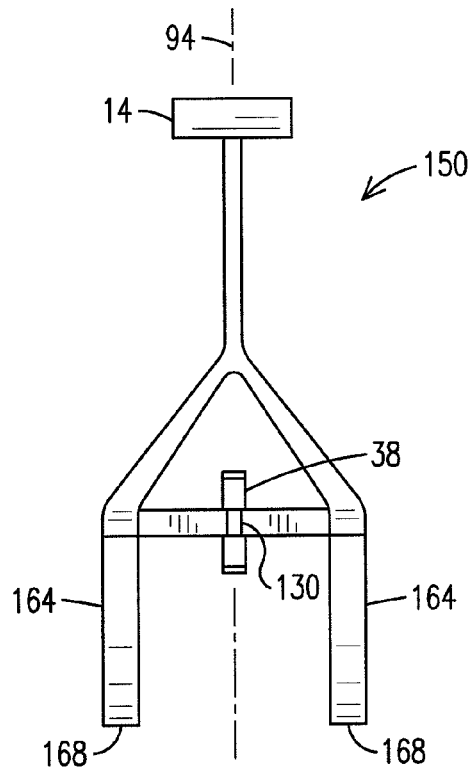
FIG. 8 is an end view of the alternate exemplary embodiment of the hand tool of FIG. 6.

FIG. 6 shows a side view of an alternate exemplary embodiment of a hand tool 150 having a differently shaped elongated main body 152 and a different handle 154. In this exemplary embodiment the elongated main body 152 begins with a single main body shaft 156 and transitions to the arcuate base end 158 via first forks 160 and second transition forks 162. FIG. 7 is a top view of the alternate exemplary embodiment of the hand tool 150 of FIG. 6. Here it can be seen that the arcuate base end 158 has two arcuate base end components 164 joined together by the first forks 160 and the second forks 162. Also visible is the handle 154 and its orientation perpendicular to the originally depicted handle. It can be seen that the puller head 38 and a point 166 on the handle 154 are within the same plane of movement 94. FIG. 8 is a rear view of the alternate exemplary embodiment of the hand tool 150 of FIG. 6. Here both of the arcuate base end components 164 can be seen, as well as respective arcuate contact surfaces 168.

Figure 9:
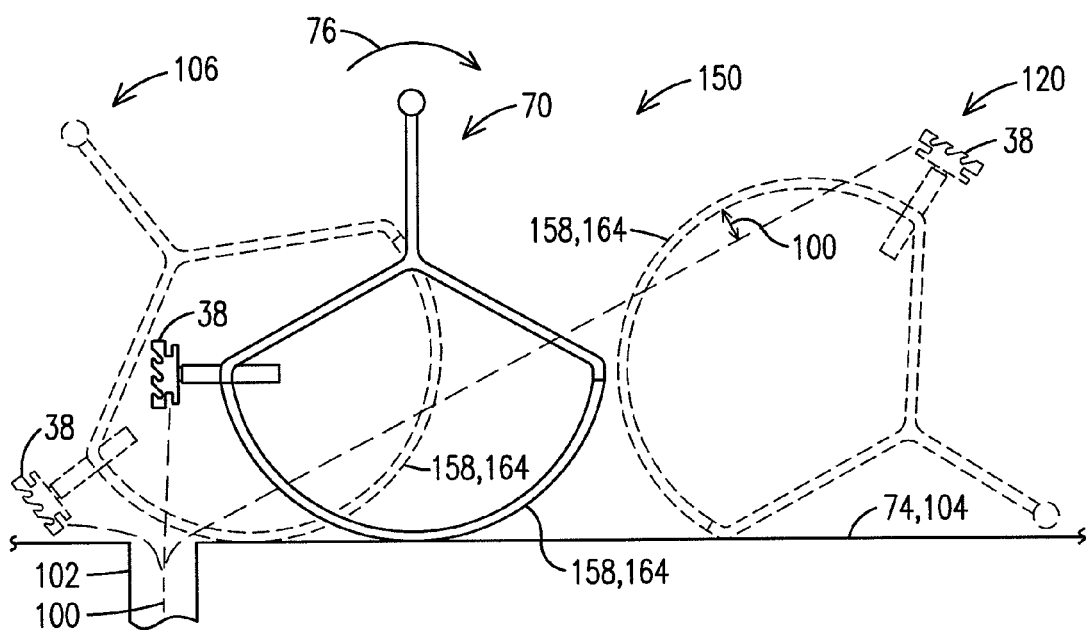
FIG. 9 is a side view showing the alternate exemplary embodiment of the hand tool of FIG. 6 in operation.

FIG. 9 shows an advantage of the alternate exemplary embodiment of the hand tool 150 of FIG. 6 in operation. The hand tool 150 may be operated as disclosed in FIG. 3, where it is moved in a first direction 76 from a hand tool second position 106, through a hand tool neutral position 70, and to a hand tool first position 120 during a drawing operation. In certain circumstances where an extreme amount of draw is necessary it can be seen that the wires/tubes 100 might otherwise interfere with the arcuate base end 158, but in this alternate exemplary embodiment the two arcuate base end components 164 are located astride the wires/tubes 100, and consequently there is no interference, allowing for a smoother and longer drawing operation.

Figure 10:
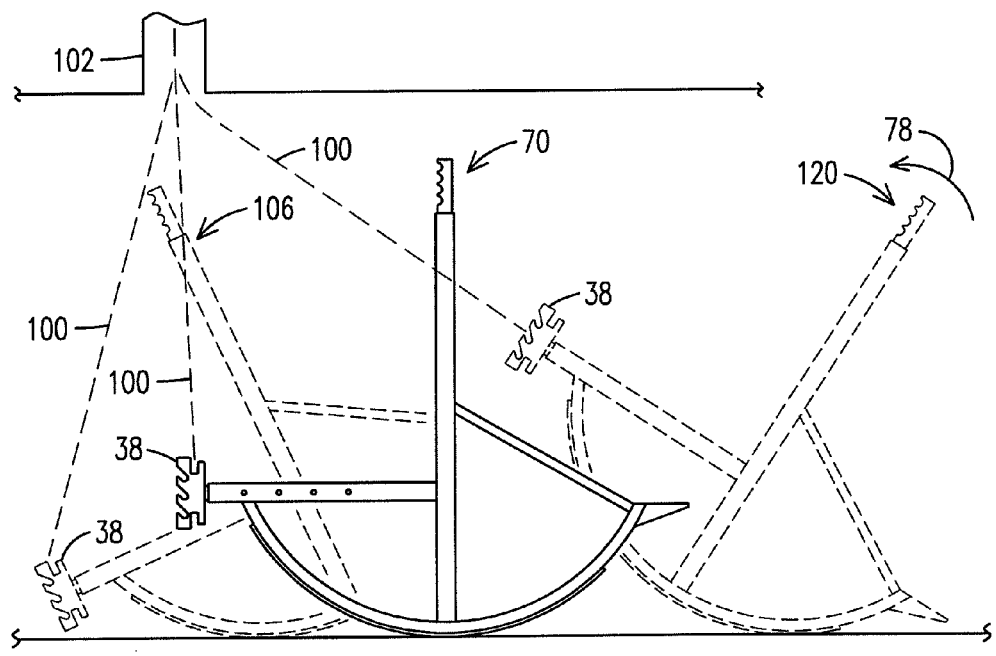
FIG. 10 is a side view showing the exemplary embodiment of the hand tool of FIG. 1 in operation.

FIG. 10 depicts the hand tool 10, 150, in another mode of drawing operation. In this mode the wires/tubes 100 may be disposed in a different location, such as above. In such a scenario the hand tool 10, 150 may begin in the hand tool first position 120 and then moved through the hand tool neutral position 70 to end in the hand tool second position 106 to effect the drawing operation. Alternately, the hand tool 10 may be oriented with the arcuate contact surface 20 in contact with a ceiling, and it may be operated as shown in FIG. 3, but upside-down. In this scenario the resistance of the wires/tubes 100 to movement and the force applied at the handle lock the hand tool 10 in place against the ceiling just as it locks the hand tool 10 against the floor 104 in FIG. 3.

Figure 11:
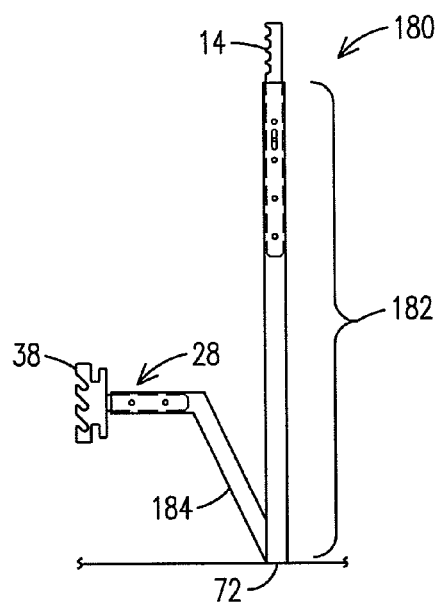
FIGS. 11-16 show schematic side views of various alternate exemplary embodiments of the hand tool.

Numerous other exemplary embodiments of the hand tool can be envisioned within the scope of the disclosure, some of which are depicted in FIGS. 11-16. FIG. 11 depicts an exemplary embodiment of the hand tool 180 where the entire elongated main body 182 is essentially a straight shaft, and the pivot point 72 remains the same throughout operation. The connection mechanism support strut 184 may connect to the elongated main body 182 proximate the pivot point 72 and extend to the puller head 38. This exemplary embodiment lacks the curved base end of other embodiments, but retains the force multiplying effect, which may be adjusted by the connection structure adjustment mechanism 28 that may or may not be present on any given exemplary embodiment.

Figure 12:
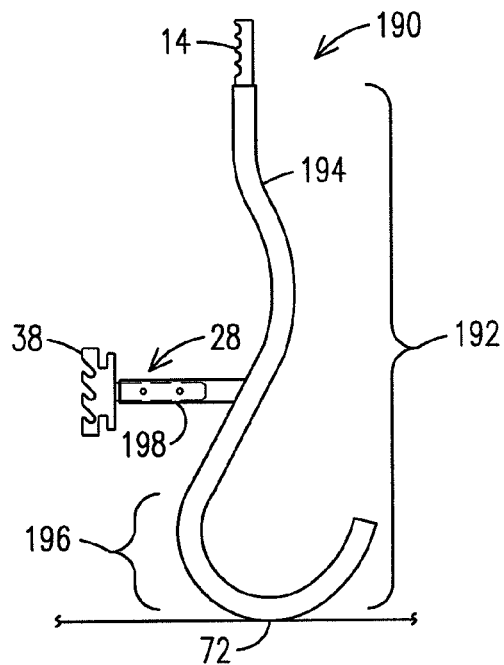

FIG. 12 depicts an exemplary embodiment of the hand tool 190 where the elongated main body 192 has a curved shaft 194, perhaps for decorative effect, and an arcuate base end 196 that blends into the curved shaft 194, and employs the same operating principles as the embodiment of FIG. 3. In addition, the connection mechanism support strut 198 extends from the curved shaft 194.

Figure 13:
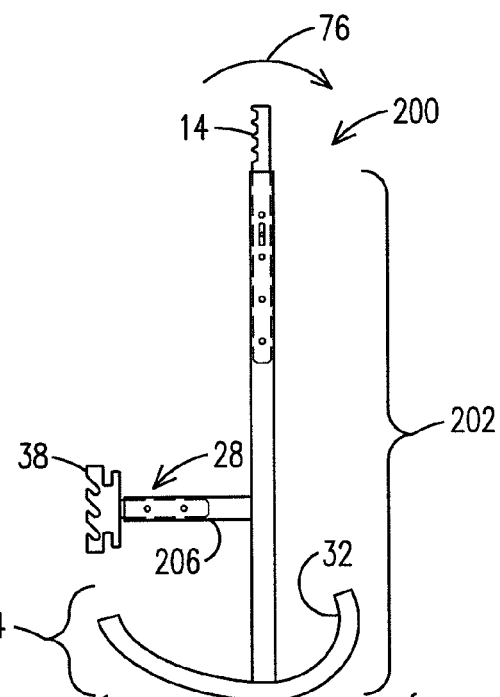

FIG. 13 depicts an exemplary embodiment of the hand tool having an elongated main body 202 and an arcuate base end 204, where when the hand tool 200 is moving in the first direction 76 the pivot point 72 moves toward the first end 32 of the arcuate base end 204, and where a radius of a contour of the arcuate base end 204 decreases toward the first end 32. As a result of the decreasing radius the ratio of force input at the handle to force output at the puller head 38 increases. Consequently, as the handle approaches horizontal, the user can apply his/her body weight in addition to any other force applied at the handle, and this additional force together with the increased force multiplier ratio will further aid drawing a more difficult pull. Also, the connection mechanism support strut 206 extends from the elongated main body 202.

Figure 14:
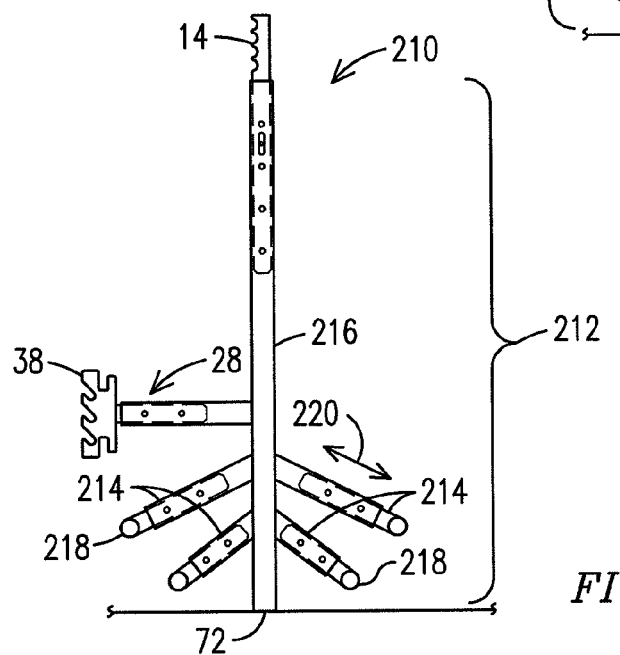

FIG. 14 depicts yet another alternate exemplary embodiment that incorporates a slightly different approach to forming the pivot point 72. In contrast to the previously described exemplary embodiments, where the pivot point 72 either moved along the arcuate contact surface 20 or a single point, in the exemplary embodiment of FIG. 14 the hand tool 210 has an elongated main body 212 and a plurality of legs 214 extending from a main body shaft 216. Each leg 214 ends in a respective contact end 218. Each leg 214 may be adjustable via a leg adjustment mechanism 220 to selectively position the respective contact end 218. The contact ends 218 may be positioned to form an arc as shown in FIG. 14. In this configuration, instead of a the pivot point 72 moving along a smooth contact surface as the hand tool 210 is rotated, the pivot point moves from one contact end 218 to another throughout the rotation. Such a configuration may be desirable when it is necessary to be able to selectively adjust the arc profile formed by the contact ends 218. For example, the arc profile could be adjusted to resemble that of the arc profile of the arcuate surface of the hand tool 200 of FIG. 13. Alternately, the arc profile could be adjusted in an opposite manner, to increase the ratio of handle movement distance to puller head movement distance etc. The arc profile selected may be selectively tailored for a multitude of various applications.

Figure 15:
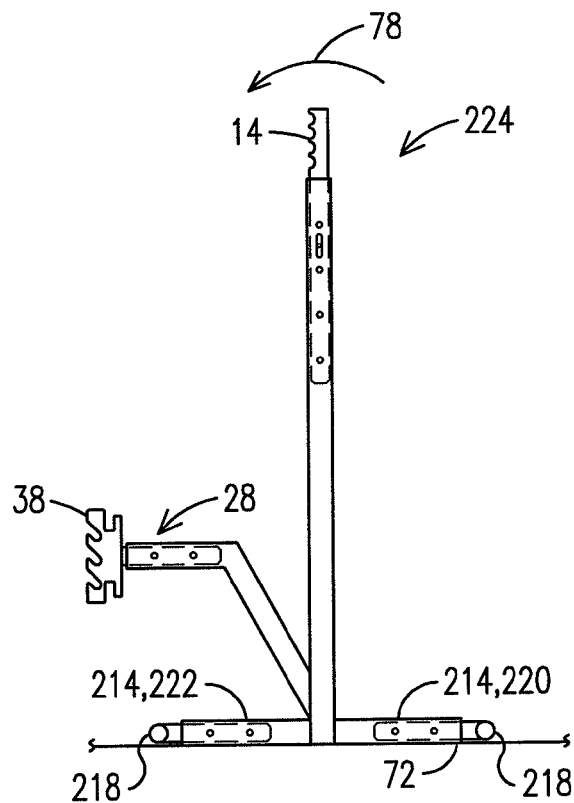

FIG. 15 depicts an exemplary embodiment that differs from the previously described embodiments. In particular, in the exemplary embodiment of FIG. 15 there are two legs 214, each optionally adjustable in length and each having a respective contact end 218. In exemplary embodiments such as this, where no single leg stands out as a leg farthest from the handle 14 and which forms the pivot point 72 necessary to define the neutral position, one leg 214 must be chosen as the leg 214 to which the neutral position applies. In these embodiments it is arbitrary which leg is selected. For sake of explanation, the right leg 220 may be chosen. As a result, the hand tool 224 is in the respective neutral position when the handle 14 is disposed vertically above the pivot point 72 created when the right leg 220 is in contact with the ground.

In all previous exemplary embodiments, when moved in the first direction 76 or the second direction 78 from the hand tool neutral position 70, all resulting handle positions were vertically lower than the handle's neutral position. In contrast, in this exemplary embodiment, when moved in the second direction 78 the handle's vertical height decreases until the respective left leg 222 contacts the horizontal plane. At this point, as the handle 14 continues in the second direction 78, it increases in vertical height until a point where the handle 14 is vertically as high as when in the handle neutral position 110. Continued motion in the second direction 78 again results in a loss of vertical height of the handle with respect to the handle neutral position 110. The handle's motion from an extreme left end of the range of motion to an extreme right end of the range of motion can be seen as outlining an "m" shape. Such exemplary embodiments might be useful when the hand tool 224 needs to stand on its own etc.

Figure 16:
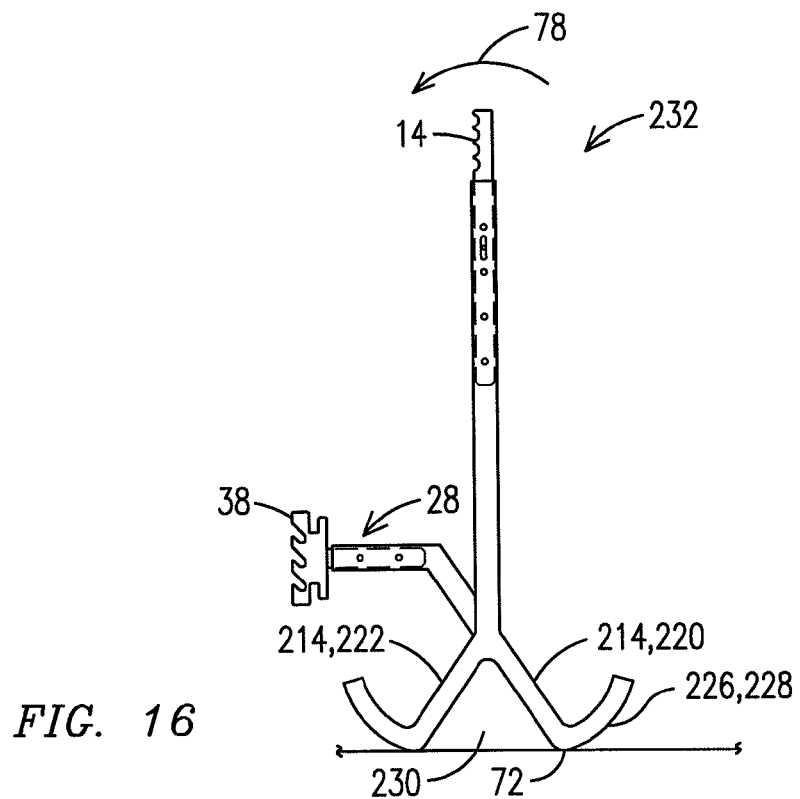

In a variation of the hand tool 224 of FIG. 15 shown in FIG. 16, instead of ending in a contact end 218, a discrete curved surface 226 could be disposed at the end of each leg 214. This could form, for example, an arcuate contact surface 228 that is, essentially, interrupted by a gap 230. As with the exemplary embodiment of FIG. 15, such an embodiment might be useful when the hand tool 232 needs to stand on its own etc.

From the foregoing it is evident that the inventor has devised an innovative and versatile, yet simple hand tool that can be used to pull wires or tubes or the like through a conduit etc. This hand tool is inexpensive, and can be used to quickly draw wires/tubes through conduit when extremely heavy duty pulling forces may not be necessary. Consequently, the hand tool represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A hand tool, comprising:
a handle at a handle end of an elongated main body;
an arcuate shaped contact surface on a base end of the elongated main body opposite the handle end;
a support strut extending laterally from the elongated main body; and
a connection structure secured to a distal end of the support strut between the handle end and the contact surface, wherein the connection structure is discrete and is configured to fit into the support strut, wherein the connection structure is rotationally fixed with respect to the support strut, the connection structure comprising a recess disposed in a perimeter of the connection structure, the recess defining a connection structure hook or a connection structure horn cleat, and an adjustment mechanism configured to permit adjustment of the connection structure toward and away from the elongated main body;
the hand tool effective to permit a range of motion of the handle and the connection structure within a plane, the range of motion including:
a hand tool neutral position where the handle is disposed in a handle neutral position directly above a pivot point on the contact surface and where the connection structure is in a connection structure neutral position,
a hand tool first position where the handle is disposed on a first side of the handle neutral position and in a handle first position that is vertically lower than the handle neutral position, and where the connection structure is in a connection structure first position vertically higher than the connection structure neutral position, and
a hand tool second position where the handle is disposed on a second side of the handle neutral position and the handle and the connection structure are in respective second positions that are vertically lower than respective neutral positions.

2. The hand tool of claim 1, wherein the pivot point moves along a continuous section of the contact surface when the handle is moved along the range of motion.

3. The hand tool of claim 2, wherein the support strut spans from a first end of the arcuate shaped base end to the elongated main body at a point between the arcuate shaped base end and the handle.

4. The hand tool of claim 1, wherein the connection structure adjustment mechanism is secured to a second end of the base end and to the elongated main body at a point between the handle and the base end.

5. The hand tool of claim 1, wherein the connection structure further comprises the connection structure horn cleat.

6. The hand tool of claim 5, wherein in the hand tool neutral position the connection structure horn cleat is oriented upright.

7. The hand tool of claim 6, the connection structure further comprising the connection structure hook integrated into the connection structure horn cleat.

8. The hand tool of claim 7, wherein the connection structure further comprises a first tab adjacent the horn cleat, and wherein in the hand tool neutral position the first tab and the horn cleat form a first recess opening downward.

9. The hand tool of claim 8, wherein the connection structure further comprises a second tab adjacent the horn cleat, and wherein in the hand tool neutral position the second tab and the horn cleat form a second recess opening upward, wherein the first recess and the second recess cooperate to form a spool shape.

10. The hand tool of claim 9, wherein the first recess and the second recess cooperate to form a flat spool shape.

11. The hand tool of claim 7, further comprising connection structure friction features disposed on the tab.

12. A hand tool, comprising:
a handle at a handle end of an elongated main body;
an arcuate shaped contact surface on a base end of the elongated main body opposite the handle end;
a support strut extending laterally from the elongated main body; and
a connection structure secured to a distal end of the support strut between the handle end and the arcuate shaped contact surface, the connection structure comprising a horn cleat and a first and a second recess, wherein the connection structure and the at least one of the hook and the horn cleat are rotationally fixed with respect to the elongated main body, and wherein the first and second recess cooperate to form a flat spool shape oriented parallel to the handle;
wherein the handle is positioned on a concave side of the arcuate shaped contact surface along a line perpendicular to a tangent of the arcuate shaped contact surface.

13. The hand tool of claim 12, wherein the connection structure is adjustable toward or away from the elongated main body.

14. The hand tool of claim 13, wherein the connection structure is discrete and is configured to fit into the support strut in a first orientation and in a second orientation where the connection structure horn cleat is rotated 180 degrees from the first orientation.

15. The hand tool of claim 12, wherein the elongated main body comprises a shaft that traverses the base end, wherein the base end comprises an arcuate shape that defines the arcuate shaped contact surface, and where the connection structure is disposed at a second end of the arcuate shaped base end.

16. The hand tool of claim 15, wherein the connection structure is in an adjustably positionable relationship with the support strut, and wherein the support strut spans between the second end of the arcuate shaped base end and the shaft.

17. The hand tool of claim 12, wherein the connection structure comprises the connection structure horn cleat and a connection structure tab disposed adjacent the connection structure horn cleat to form a connection structure recess.

18. A hand tool, comprising:
a handle at a handle end of an elongated main body;
an arcuate shaped contact surface on a base end of the elongated main body opposite the handle end;
a support strut extending laterally from the elongated main body; and
a rigid connection structure rigidly secured to a distal end of the support strut, between the handle end and the arcuate shaped contact surface, the connection structure comprising a hook and a horn cleat;
wherein the handle is positioned on a concave side of the arcuate shaped contact surface along a line perpendicular to a tangent of the arcuate shaped contact surface.

19. The hand tool of claim 18, wherein the connection structure horn cleat comprises two horns, and wherein the connection structure hook is disposed between the horn cleats on a side opposite the elongated main body.

* * * * *